June 6, 1933.  C. C. KENYON  1,913,120
WEIGHING APPARATUS FOR A CONTINUOUS WEB STOCK
Filed Aug. 19, 1930    2 Sheets-Sheet 1
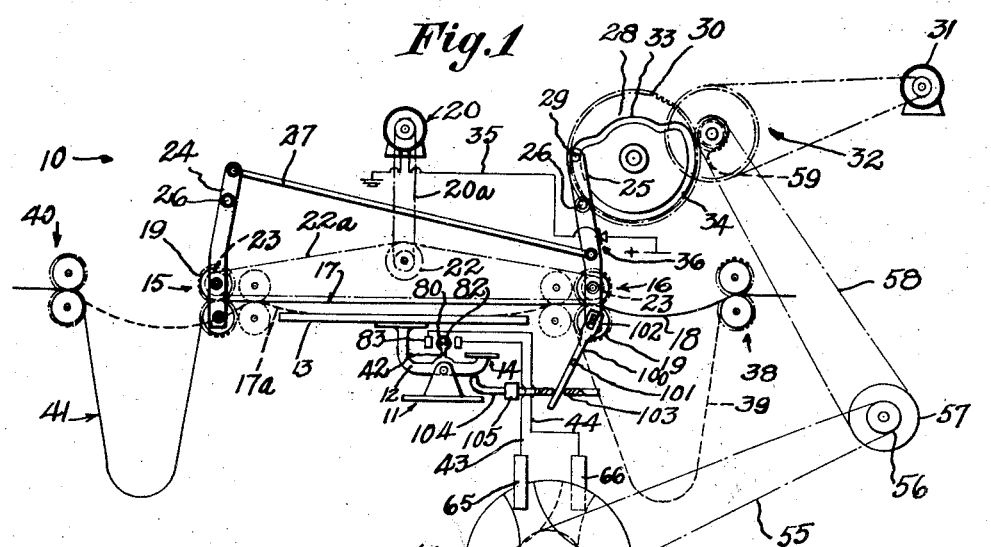
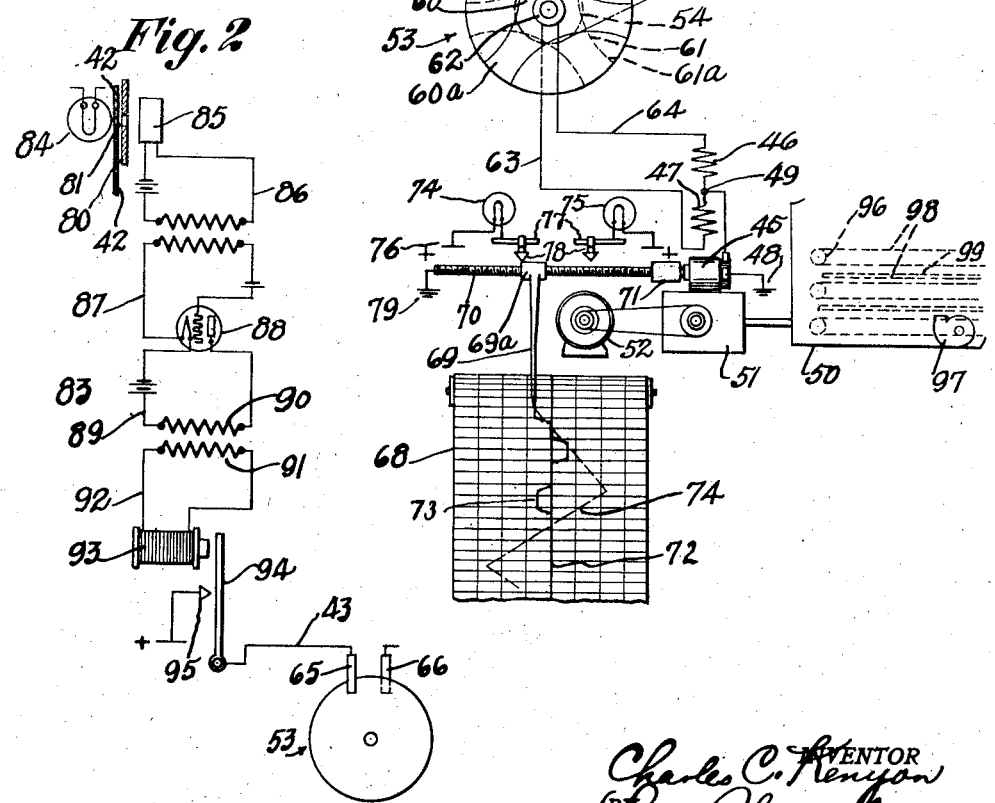

June 6, 1933.  C. C. KENYON  1,913,120
WEIGHING APPARATUS FOR A CONTINUOUS WEB STOCK
Filed Aug. 19, 1930  2 Sheets-Sheet 2

INVENTOR
Charles C. Kenyon
BY
ATTORNEY

Patented June 6, 1933

1,913,120

UNITED STATES PATENT OFFICE

CHARLES C. KENYON, OF SOMERVILLE, NEW JERSEY

WEIGHING APPARATUS FOR A CONTINUOUS WEB STOCK

Application filed August 19, 1930. Serial No. 476,406.

This invention relates to devices for causing a continuous product to be produced with uniform characteristics, the invention has particular reference to devices and relating to the drying of textile fabrics, including not only the heavier fabrics but also the most delicate silks.

One object of the invention is to provide a device of an improved highly sensitive and accurate nature for constantly weighing a continuous product as it is produced by a machine, to obtain indications of variation in the product from a desired standard.

Another object of the invention is to provide a device having improved means for intermittently successively stopping integral portions of a continuous product with respect to a weighing apparatus and causing the portion so stopped to actuate the weighing means in any predetermined size ratio, and controlling the speed of the machine producing said product to obtain a uniform product.

Another object of the invention is to provide a device having improved means to accurately indicate a variation from standard in the moisture content of a delicate textile fabric.

Another object of the invention is the provision of a scale having improved photosensitive means operated thereby according to the indications of the scale to cause the actuation of a signal or machine.

Another object of the invention is to provide improved means for intermittently stepping up or slowing down the machine to obtain a gradual change to a desired operating condition.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a diagrammatic view showing a device embodying the invention.

Fig. 2 is an enlarged view of a photosensitive means operated by the scale.

Figure 3:
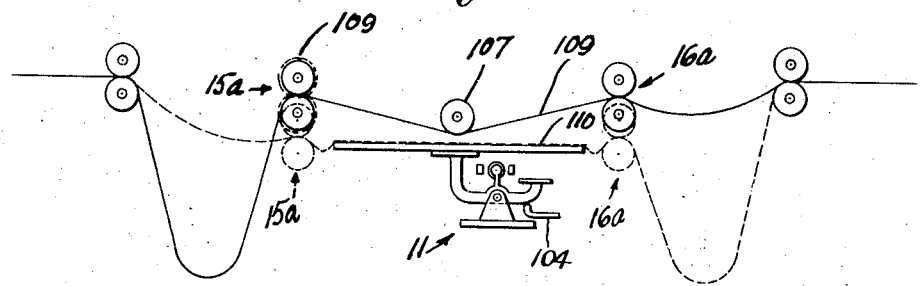
Figs. 3, 4 and 5 are diagrammatic views showing modifications of the invention.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawings, therefore, are submitted merely as showing the preferred exemplification of the invention.

Generally stated, this invention provides a device applicable to the manufacture or treatment of continuous products, and is intended particularly for the art of drying textile fabrics which are produced in uniform widths. The especial advantages of the invention may be noted from the fact that textile fabrics after being dyed are passed through a drier, and if the product has too high a moisture content, it may become mildewed, or the product as folded into layers may have the fold edges of the layers which are exposed to the atmosphere change in color due to the action of oxygen and moisture on the dyes; while if the product is too low in moisture content, it generally means that the fabric has been overheated in the dryer, causing a deleterious change therein, and ordinarily the fabric, especially if it is a delicate silk can never be restored. Furthermore, the fabric if too dry may absorb moisture from the atmosphere at certain portions thereof which may cause an undesirable change in the fabric or variation in the dye. It is therefore desirable that the fabric produced by the drier may have a uniform or standard moisture content, which may be initially determined by inspection or in any other manner well known in the art, and of course, such standard moisture content may vary with the thickness of the material, the nature thereof, the dyes therein, the uses to which the product is to be put, the manner of use or packing, and other factors. Also since heat is employed in the drier, and other things being equal, as they generally are, in a well constructed machine which has been adjusted for a certain performance, the moisture content is an indication of the heat to which the fabric is subjected in the drier, so that the conditions to which the fabric is subjected in this regard may also be varied by changing the speed of the machine. Thus it will be seen that by weighing the product to obtain an indication as to a variation in the moisture content thereof, there is also obtained an indication as to the relative temperature or variation in temperature. A variation in temperature will ordinarily occur infrequently, and slight variations are taken care of by changing the speed of the machine, while substantial variations may be taken care of automatically or manually by the operator who being familiar with the performance of the machine, will by this invention become quickly cognizant thereof, avoiding damage to the fabric.

It is thus clear that by preventing the moisture content in the fabric from dropping below a prescribed minimum, overheating is prevented, not only by the proper control of the machine, but by the influence of the moisture itself.

Textile or other fabrics to which this invention may relate, include fabrics of various weights, some being quite heavy and others, such as silks, being as low in weight as one and a half ounces to the square yard. To detect variations in the moisture content of so light a fabric, a special scale must be used capable of weighing to one two hundredth or even one two hundred and fiftieth of an ounce. The degree of accuracy required in the scale may be further indicated by the fact that the best possible scale that the present day art can produce must be limited to operate within a narrow prescribed range of weights, so that several scales may be required for the entire line of textile fabrics. Of course such scale, being extremely sensitive, must be operated without vibration from either the machine or the fabric. This is necessary both for the accurate functioning of the scale and because with such a scale, any disturbance during the weighing causes the scale to continue vibrating.

It will be understood that this invention does not require that the actual moisture content of the fabric be weighed, but only that a delicate indication be obtained of a change in the moisture content from a uniform standard, and the weight of the moisture content need not be known at all. Also the operation of the invention is independent of the actual weight of the fabric, or of any portion or section thereof, variations from some uniform predetermined weight being all that is necessary.

While it is stated that the speed of the machine is changed, it will be understood that the general performance of the machine may be changed in any suitable manner, as, for example, by changing the volume of air passing through the drier, or by changing the temperature therein, or both. It has been found, however, that the most preferable manner to adjust the treatment of the fabric is by changing the speed of the machine, this producing, ordinarily, a more desirable and more rapid manner of adjustment. For example, with the drying machine heated up to a certain temperature, whether too high or too low, the body of the machine retains too much heat for a rapid adjustment to be effected. But by speeding up or slowing down the machine, adjustment of the treatment both with respect to the drying and to the heat treatment of the fabric is readily effected. A change in the speed of the machine is also more positive in changing the treatment of the fabric to obtain a uniform product than changing the volume of air flow. Thus while various devices and methods of regulation of the drier may be used within the scope of the invention, the most desirable features are pointed out.

The foregoing statements apply in many phases of the principles disclosed to continuous products of various types and are not to be limited to fabrics. Thus they apply to the art of manufacturing paper, or thread, or wire, or liquids, or granular materials, and to all products continuously produced and in continuous form. The applicability of the invention to these various arts will become clearly apparent hereinafter. It may be here noted, that the invention is applicable regardless of the removal of the moisture content as in fabrics, and where, as in paper, a product of uniform thickness is to be obtained, or where a material is extruded, as wire, or where a material is coated, or where various chemicals and the like are produced, the uniformity in weight of which may be an indication as to certain characteristics of the structure, mixture, or composition.

The term weight as used herein may in a certain sense be regarded as equivalent to density particularly in regard to fabrics, but the term weight is broader since it may be independent of density. Moreover, terms weight and size as used herein may be taken with respect to a unit of area smaller than the sections measured by the measuring means, as, for example, weight per square inch of fabric, it being sufficient that a constant relationship be maintained between the size of the fabric sections and the scale setting such that the weighing means is responsive to a fabric condition that is to be indicated. The scale may be reset for the same or different fabrics and as often as desired according to the characteristics of the fabric. Hence it will be understood that the invention includes the maintenance of a constant relationship between a scale, an area of a section of a fabric, and the amount or degree of slack in said section, since any one, or even two of these factors may be changed as often as desired providing that a compensating change is made in the other or remaining factors. In simplified form, these factors will be unchanged so as to indicate the changes in weight or density of a fabric of uniform width having a uniform amount of slack produced in sections of constant length to produce an indication of changes of weight in the fabric.

Generally described, the invention provides an intermittent weighting means, and other means to hold predetermined integral portions of a continuous product stationary with respect to said weighing means, for successive intermittent weighing of portions of the product, to indicate slight deviations from a standard condition. This weighing means may automatically adjust the speed of the machine producing the product, or the machine may be manually adjusted by the operator, in which case a suitable signal means is preferably operated. That part of the apparatus employed, which coacts with the weighing means, carries the product above the weighing means and intermittently stops, and produces a predetermined amount of slack in an integral section of predetermined size or area of the continuous product, the slack actuating the weighing means. The latter may have a pointer or the equivalent, which upon movement in either direction causes an electrical device to be operated, which device may be a signal, or a reversible motor for increasing or decreasing the speed of the machine. Since the needle oscillates before coming to rest, and may therefore cause actuations in both directions, it may be found desirable to so construct the device as to prevent actuation before the needle has come to rest. With uniform conditions, the necessary time element for this may be determined. The device is also so constructed that, where the speed of the drier is controlled by the weighing means, the change in speed occurs intermittently, so that assuming that the weight of the product or moisture content is above standard, the machine is intermittently slowed down. This serves to keep the product nearer to the standard in the ultimate performance of the machine, and this principle of intermittent change in speed of the machine may be used with continuous weighing devices as well as with intermittent weighing devices. After the weight indication has been obtained, the means bringing a portion of the product into stationary contact with the weighing means operates at sufficient speed to take up the accumulated product.

Referring in detail to the drawings, 10 denotes a device embodying the invention. The same includes a scale 11 which may be of any suitable type, and of sufficient sensitivity to be comparable, for example, to scales employed in the quantitative analysis of materials. The scale may include a lever 12 carrying a table 13 and a support 14 for weights. Disposed at opposite ends of the table are roller units 15 and 16, which are an exact predetermined distance apart. These roller units support a section or portion 17 of a continuous product or textile fabric 18 of uniform width, and with the roller units being spaced at a predetermined accurate height above the table 13. The construction of the rollers is such that a predetermined length of the fabric is measured off between the units 15 and 16, and the section 17 is supported out of contact with the table of the scale. The rollers of the roller units may be geared together at 19. Driving said roller units is a motor 20, having a sprocket chain 20a engaging any suitable speed reduction means 22 to drive a sprocket chain 22a interconnecting with sprockets 23 of the said units.

Mounting the roller units 15, 16 are levers 24, 25 respectively, which are pivotally mounted at fixed pivots 26. Interconnecting said levers for equal oscillation is a link 27. In this way the said levers 24, 25 are movable toward each other to bring the roller units 15, 16 into the dotted line positions.

To oscillate the levers 24, 25, a positive cam 28 actuates a pin 29 of lever 25. This cam may be uniformly rotated by a gear 30, driven by a motor 31 with any suitable speed reduction means 32. Thus the roller units 15, 16 are intermittently moved toward and away from each other, the cam having portions 33, 34 each of constant radius, and said cam portions being of any desired relative lengths, though the latter is preferably longer to retain the rollers for a longer period of time in the position shown in full lines than in the position shown in dotted lines.

To releasably lock the scale 11, a lever 100 is mounted on a fixed pivot at 101 and having pivotal lost motion connection at one end 102 with the lever 25 and at its other end 103 with slide bar 104, guided along a suitable cross head 105.

To cause the roller units to be intermittently rotated, the circuit 35 of motor 20 may include a switch 36 actuated in any suitable manner and preferably in synchronism with the cam 28. For example, the said switch may be operated by the lever 25, and in such manner that when cam 28 begins to move the roller units to the dotted line position, the switch 36 is opened and motor 20 stopped.

When the slack 17a produced in the section 17 comes into engagement with the table 13, the motor 20 will have completely stopped so that said section is at rest. If required, a friction brake may be employed to stop the motor with sufficient rapidity, but this being within the knowledge of the mechanical arts, has not been shown.

While the fabric 18 may be delivered to the roller units 15, 16 in any required manner, I show another roller unit 38 rotating constantly and at a speed uniform with that of the drier conveyor, and which may form part of the drier or other machine producing the fabric. When the roller units 15, 16 stop, a slack or loop 39 is formed, but this is taken up when the motor 20 again begins to operate, since the roller units 15, 16 operate at higher speed than the roller unit 38. A similar structure may be provided, if desired, at the outlet end of the device, including a roller unit 40 rotating constantly and at uniform speed with respect to the drier conveyor, a slack or loop 41 being produced in the product while motor 20 is operating, and being taken up when said motor stops. Thus the product may be uniformly folded by any suitable device (not shown).

The scale 12 may include any suitable pointer 42 or the equivalent, to operate one of a plurality of electrical circuits depending on whether the pointer is at the right or the left of neutral position. A simple arrangement is to cause the pointer to make engagement with electrical contacts adjacent thereto, but I prefer to use photosensitive means hereinafter described. In any event, there are two leads 43, 44, having connection with a reversible series motor 45, provided with field windings 46, 47, in the leads 43, 44, respectively. One side of the motor armature may be grounded at 48, and the other connected between the field windings. Operated by the reversible motor 45 is a suitable means, either electrical or mechanical for changing the speed of the machine or drier 50. For instance, a mechanical variable speed transmission 51, which may be of the Reeve's type is controlled by said motor and transmits power from motor 52 to the drier. Thus if the motor 45 rotates in one direction the speed of the drier 50 may be increased, while if the rotation is in an opposite direction the speed is decreased.

Since the sensitive scale vibrates before coming to rest, causing an oscillation of pointer 42 which may be sufficient to cause successive functioning of both leads 43, 44, I provide means operating in synchronism with cam 28 to control the circuits in alternation with the scale so as to prevent the circuits from being closed, except after the lapse of a time interval sufficient to allow the scale to come to rest. One form of such means may include a multiple contact element 53 which is constantly rotated at uniform speed by any suitable means, as for instance, a sprocket wheel 54, a sprocket chain 55 and speed reduction means including sprocket wheels 56, 57, sprocket chain 58, and sprocket wheel 59, rotated by the speed reduction means 32.

The said element 53 may be made of insulation, and is provided on opposite sides with electrical conductor plates 60, 61 so cut as to provide regularly spaced contacts 60a and 61a at the periphery of the element. These plates 60, 61 make individual electrical contact with central contact members 62 on opposite sides of the element, the said members being connected by wires 63, 64 to the field winding 46, 47. Brushes 65, 66 are provided in the circuits 43, 44 to make contact with the respective elements 60, 61. Before the scale comes to rest, the brushes 65, 66 are in contact with the insulating part of element 53, so that the leads 43, 44 are open and motor 45 cannot be energized. Then when the scale has come to rest, the brushes are in contact with the conductor members 60, 61, so that either of the leads 43, 44 may function to cause the motor 45 to rotate in a corresponding direction.

The element 53 may also be arranged so as to cause motor 45 to be only momentarily energized, so that as the contacts of the said element come into intermittent contact with one or another of the brushes 65, 66, the motor 45 is intermittently operated to increase or decrease the speed of the machine 50, in a plurality of steps. Thus a substantial change in the speed of the machine cannot occur suddenly, such result being undesirable because the resultant change is usually excessive, with the result that the machine hunts over a comparatively wide range. To effect this purpose the size of the contacts 60a and 61a may be of predetermined or relatively small area, according to the desired time interval of operation or number of rotations which the motor 45 shall make at any one step of its operation.

It will thus be seen that element 53 may be constructed either to cause the motor 45 to be actuated only after the scale has come to rest, or to cause the motor to be operated only to a predetermined extent for an intermittent change in the speed of the machine in either direction, or to accomplish both of these functions, as herein contemplated.

The intermittent change in the speed of the machine may be advantageously illustrated on a graph 68 upon which a pen 69 may draw a curve to show the operation of the machine 50. The said pen may have a hub 69a threaded on a screw 70 turned by the motor 45 through a suitable speed reduction means 71. At 72 may be a line of standard performance, and as the motor 45 turns in one or in an opposite direction, the pen 69 is moved correspondingly in one or in an opposite direction, with respect to said standard line. The curve 73 shows a typical performance with intermittent change in the speed of the machine. For the sake of comparison, curve 74 is shown to illustrate the operation of the machine without intermittent operation, and it will be seen that the former curve shows a smaller average deviation from the standard, and a smaller range of hunting for the machine.

The machine 50 may be manually controlled, this offering in many instances advantages in point of more accurate adjustment of the machine by the skilled operator to whom a variation in the product of the machine can be indicated by any suitable signals, such as lamps or bells. To this end it would suffice that the motor 45 need not operate the transmission 51, but merely some member such as hub 69a to close circuits through lamps 74, 75, which may be differently colored, the one to indicate an excess in moisture content of the fabric, and the other a decrease in the moisture content thereof. Each lamp may be connected to a line circuit at 76 and to a bar 77 having a sliding adjustable contact 78 to be engaged with said hub, the circuit being completed therethrough and through the screw 70, which is grounded at 79. The contacts 78 are set to notify the operator when a sufficient deviation from the standard has occurred to require his attention for readjustment of the machine, and the length of the hub is sufficient to cause the engagement with the contact to continue if the variation from the standard continues.

However, regardless whether the machine 50 be manually or automatically controlled, the motors 20 and 31 may be controlled to maintain a speed in synchronism with that of the machine, or the drive or conveyor thereof. Preferably an automatic control may be provided for the motors 20 and 31, such control being well known in the arts and of any conventional type and hence not shown. One type of control which may be suggested operates to change the voltage on a motor, which may be of any standard variable speed type and driven in a suitable manner in synchronism with the speed of the drier conveyor. In fact, it is unnecessary to use the suggested motors 20, 31 as the same may simply be replaced by sprocket wheels connected to the conveyor drive of the machine 50. The units 38 and 40 may, of course, constitute a part of the drier conveyor and operate uniformly therewith. The roller units 15, 16 and 38, 40 may include frictional fabric engaging rollers as shown, so as to engage the fabric with any desired degree of force. It will be understood, however, that this invention in its broader aspect does not require that the means for measuring and feeding the sections over the scale shall operate at the same speed as the machine 50, since it is not an esesntial prerequisite that the weighing of the product shall necessarily occur at a fixed time interval after its delivery from the machine.

In order to add sensitivity to the operation of the scale 11, it is preferable as aforementioned that the same shall control the circuits 43, 44, not by means of contacts actuated by the scale, but by a photosensitive means, as by cutting off or admitting light thereto. Thus a plate 80 may be provided having a plurality of spaced openings 81 for the passage of light, these openings being controlled by a shutter element 82 which may be integral with the pointer 42 of the scale. The arrangement, shown schematically in Fig. 1, includes a plurality of photosensitive units 83 activated by light from any suitable source 84. When the pointer is in neutral position, the shutter closes both of the openings 81 to prevent the passage of light to either photosensitive unit, but when the pointer is in a position off neutral, one of said openings is exposed to receive light.

Each photosensitive unit may be of any well known type, and may include a photosensitive cell 85 connected into a circuit 86. An input circuit 87 may be provided, and an amplifying tube 88, and an output circuit 89. The latter may have an inductance coil 90 and a coacting inductance coil 91 in a circuit 92 in which the electromagnet 93 is connected. The electromagnet operates a spring armature 94 so that when the former is energized, the armature engages a contact 95 connected to the positive side of a line and completing a circuit 43.

If the machine 50 be a drier, it may have a plurality of spaced rollers 96 to support cloth in a plurality of spaced layers therein. A fan 97 may blow air into the drier, and heating coils 98 may be disposed in the drier or between the layers of fabric 99 to impart heat thereto and to the air. Thus by changing the speed of the machine, the degree of heat imparted to the fabric, or the moisture content thereof, or both, may be varied.

The general operation of the invention will now be described. In the first place, it will be noted that the invention provides for the determination of a variation in the moisture content of continuous textile fabrics continuously produced from a drier by constantly weighing the fabrics as produced. This factor, with the important advantages thereof, is irrespective of whether the weighing be a continuous or an intermittent operation. Another factor is that determination of a variation in the heat to which a product is subjected is obtained, broadly, by ascertaining a variation in the moisture content thereof, in any suitable manner well known in the art, and more specifically by weighing said product. This factor is applicable not only to textile fabrics, paper, but to all articles whether continuous or discontinuous, and having moisture therein or thereon and which are subjected to any kind of heat treatment. If the product being heat treated does not have a moisture content it may be subjected to a suitable degree of moisture, according to the nature of the product, and subsequently weighed to accurately determine the slightest degree of overheating. As the moisture is in or closely around the product, there is afforded an accurate determination of any overheating to which the product has been subjected.

This feature is also applicable whether the product has a content of moisture or some other kind of liquid. It will be appreciated that the first and second factors of the method above defined may be independent. In the drying of textile fabrics the invention has advantages in respect to both factors, because if a fabric, for instance, a delicate silk becomes too dry because it remains too long in the drier, and as a consequence overheats, or becomes too dry because the drier is operating at too high a temperature, and therefore overheats and becomes damaged.

The operation of the invention in determining a variation in the heat treatment to which a product has been subjected, by weighing the said product, may be used with respect also to lower limits of temperature or heat treatment for a lesser period of time, although the method is of especial advantage to prevent overheating or burning of a product which can be damaged at some temperature at which the liquid evaporates, having regard to operating conditions of temperature, humidity, air velocity, etc. It will ordinarily suffice for the operator to obtain some test data to set the scale and adjust the heating machine. The operation is also applicable to liquids, and even to solids having a vaporizable element in the form of a liquid, solid or plastic material. In view of the clear and satisfactory operation with textile fabrics, it is believed to be unnecessary to cite further instances.

With continuous products, continuously produced, the operation of the invention contemplates the intermittent weighing of successive integral sections of the product while holding in stationary relation to the scale each section being weighed. While this operation is preferably automatically effected, it can also be done manually, for example, a rule may be used by the operator to measure off a portion of the fabric, and suitable indicia may be associated adjacent to the scale to produce a predetermined slack therein, to actuate the scale to obtain an indication of a variation from standard conditons. As a correctly designed machine ordinarily operates quite uniformly, such a test made now and then by the operator may suffice.

The detailed operation of the device will now be clearly apparent. Assuming, for instance, that the fabric delivered by the machine has the prescribed moisture content, the pointer 69 will be at or adjacent to line 73 of the graph, the scale balancing as between the weights and the actuation of the slack 17a. The intermittent weighing operation is as follows:

Cam 28 is turned by a constant speed motor 31, causing levers 24, 25 to oscillate between exact predetermined limits of position to create a predetermined uniform slack 17a in successive portions of the continuous fabric to actuate the scale 11. In the full line position of the device, the scale 11 is locked by the member 104, but when the roller units for section 17 move to dotted line position, the said element 104, operated by levers 100 and 25, releases the scale so that it may detect a variation in weight and hence in the moisture content or heat treatment of the fabric from standard conditions. While the weighing occurs, the circuit for motor 20 is open at switch 36, so that the section 17, or slack therein, is stationary in relation to scale 11, for an accurate and rapid weighing operation. While the delicate scale 11 is coming to rest circuits 43, 44 otherwise controlled by the former are maintained open by the element 53, so that the reversible motor 45 cannot be operated as a result of a mere vibration of the scale. Element 53 rotating in synchronism with cam 28 or other suitable part of the device, is timed to close the circuits 43, 44 after an interval determined to be sufficient for the scale to come to rest under any condition. Now if the fabric has the desired moisture content, circuits 43, 44 are not caused to function, and hence motor 45 is not operated. But if the moisture content vary from standard, one of these circuits operates to cause the motor 45 to turn in a direction to make a suitable adjustment in the speed of the drier. While any suitable circuits may be used, and activating means therefor, I prefer to use photosensitive units 83. As the contacts 60a and 61a of element 53 make contact for a predetermined short length of time, it results that any material variation in the speed of the machine is corrected in intermittent steps to rapidly obtain an average condition, and since the machine will ordinarily vary only slightly due to the constant operation of the intermittent weighing means, a sensitive adjustment is thus obtained. Also signals 74, 75 may be operated, or in lieu of an automatic regulation of the machine 50. The latter may be a drier or other heat treating apparatus, and as the product is continuously produced therefrom, a slack 39 and 41 is produced, when the roller units 15, 16 stop, and the slack is taken up when the said roller units begin to rotate, such rotation being for that purpose at a suitably higher speed.

In Fig. 3 is shown a modification of the invention, embodying principles hereinbefore described, but with this difference that roller units 15a and 16a co-operate with an intermediate idler 107 disposed in a fixed position out of the plane of the former. The rollers of unit 15a may be geared together at 108 and driven in any suitable manner and the unit 16a may function as an idler, so that a uniform length of fabric is always measured off between the said units, the fabric being under any desired relatively small degree of tautness. Said units are movable vertically downward to a predetermined dotted line position as shown, the measured-off section 109 thereby having a looseness or free portion 110 suitably positioned and distributed on the table of the scale 11 to accurately actuate the same for an indication of a slight variation in the moisture content of the fabric from the standard or limits defining the standard. In the same manner, in Fig. 1, the roller unit 15 may alone be operated by the motor 20, and the unit 16 act as an idler.

Figure 4:
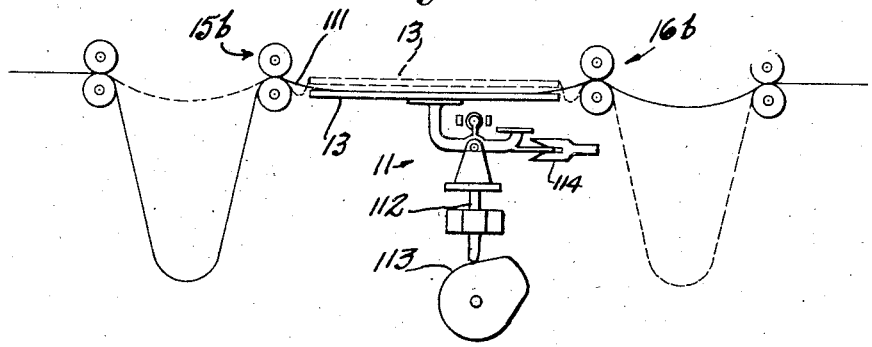
Figure 5:
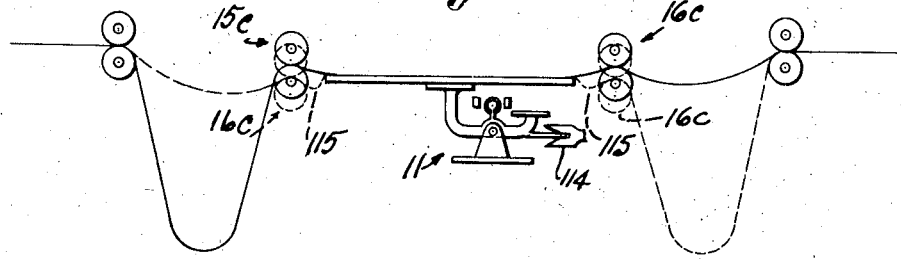

In Figs. 4 and 5 are shown modifications of the invention in which the successive sections are measured off with a small slack therein, which may continuously engage the scale so that the fabric moves continuously along the same. This necessitates that the scales be locked, except during the actual weighing operation, at which time the section being weighed is stationary with respect to the scale, as hereinbefore described. The rollers are so constructed as to engage the fabric without any tendency to slipping. Thus the rollers may be covered with rubber or other resilient material to snugly grip the fabric, or the rubber may be further covered with a material similar in nature to the fabric being weighed to minimize any degree of slipping. The rollers may also have points to engage the side edges of the fabric, or other suitable means may be utilized.

More specifically, in Fig. 4 are shown roller units 15b and 16b measuring off a section 111. The scale 11 is mounted for vertical reciprocation by a bar 112, actuated by a cam 113 synchronized with cam 28 to raise the scale with the table 13 in dotted line position when the section to be weighed is stationary. When the scale is in the full line position, and before the fabric section has become stationary, the scale may preferably be locked against vibration or movement in either direction, by a forked means 114 which may be operated the same as bar 104 in Fig. 1.

In Fig. 5, the scale 11 is stationary while the roller units 15c and 16c are vertically adjustable to the dotted line position. This produces a uniform looseness 115 at both ends of the section, so that the latter may accurately and freely actuate the scale. A locking means 114 is provided for the scale, as in Fig. 4.

It will be appreciated that this invention is applicable especially to the drying or other heat treatment of textile fabric, but the invention can be used also for many other products, and is of general scope.

It may be noted that the device may also be used to regulate the weight of materials handled in short lengths. Still another application of the apparatus is in feeding predetermined amounts of moisture or liquids to fabrics, as in the shrinking of woolens, and in other processes of manufacture of textiles. The liquid may be supplied, for instance, by a spray, and the speed of the machine or the spray itself regulated to supply a uniform amount of liquid to the fabric.

It will be appreciated that various changes and modifications may be made in the device as shown in the drawings, and that the same is submitted in an illustrative and not in a limiting sense, the scope of the invention being defined in the following claims.

I claim:

1. A device for indicating a variation in the weight of a continuous product, including means for continuously delivering the product, weighing means, and means to receive the product from the delivering means and to intermittently move integral sections of uniform size of the product over the weighing means and to hold said sections stationary with respect to the weighing means during the individual weighing of the sections.

2. An intermittently operated device for indicating a change from a standard in the weight of a product, including weighing means, and other means to move the product relative to the weighing means and to intermittently successively stop the movement of integral sections of uniform area of the product with respect to said weighing means, said other means producing a slack in the stopped sections to actuate the weighing means.

3. A device for indicating a variation in the weight of a continuous flexible product, including a weight responsive means, and feeding means for moving the product relative to the weight responsive means, said feeding means having spaced elements continually measuring integral sections of uniform size of the product and carrying each section at the ends of the latter with a slack in the product between said ends, the weight responsive means being intermediate of said elements, the feeding means disposing the section so that a central part of the section rests on the weight responsive means for actuation thereof.

4. A device for indicating the weight variations of a continuous web product, including a weighing means, means to intermittently move predetermined increments of the product into and out of contact with the weighing means, including means for producing a slack of constant length and sag in the product above the weighing means for actuating the weighing means, and means to cause the means for producing the slack to dwell during the actuation of the weighing means.

5. A device for indicating a variation in the weight of a continuous flexible product including a weight responsive means, and feeding means for moving the product relative to the weight responsive means, said feeding means having spaced elements continually measuring integral sections of uniform size of the product and carrying each section at the ends of the latter with a slack in the product between said ends, the weight responsive means being intermediate of said elements, the feeding means disposing the section so that a central part of the section rests on the weight responsive means for actuation thereof, the feeding means holding successive spaced sections of the product intermittently stationary relative to the weight responsive means for the weighing operation.

6. A device for indicating a variation in the weight of a continuous flexible product including a weight responsive means, and feeding means for moving the product relative to the weight responsive means, said feeding means having spaced elements continually measuring integral sections of uniform size of the product and carrying each section at the ends of the latter with a slack in the product between said ends, the weight responsive means being intermediate of said elements, the feeding means disposing the section so that a part of the section intermediate the ends thereof rests on the weight responsive means, the end parts of the section spanning the space between said elements and the weight responsive means being disposed in relatively shallow curves, the feeding means holding successive spaced sections of the product intermittently stationary relative to the weight responsive means for indicating a variation in the weight of the product.

7. A device for indicating a variation in the weight of a continuous web product including means for feeding said product and creating a slack in successive uniform areas thereof, weighing means successively actuated by the slack in the different areas thereof, said slack area and weighing means having a constant relationship and the weighing means being calibrated to indicate the variation in weight of the product.

8. A device for indicating a variation from standard in the weight of a continuous product, including weighing means, measuring means to successively intermittently hold integral sections of uniform size of the product stationary with respect to the weighing means during the weighing of a stationary section, said measuring means producing a uniform amount of slack in the individual sections, and means to cause a relative movement between the weighing means and a part of the measuring means to cause the weighing means to be actuated by the slack in the successive sections.

9. An intermittently operated device for indicating a variation in the weight of a continuous product, and means for bringing the product into coaction with the same, including means to measure successive sections of uniform area of the product with a uniform slack in the sections, and to move the sections over the weighing means, means to intermittently stop the means for moving the sections, and means to cause a relative movement of the weighing means and the means for moving the sections for successive actuation of the weighing means by the slack.

10. A device for determining variations in the weight of a continuous product of uniform size, said device including weighing means, means for continuously delivering said product, a second means to feed the delivered product over the weighing means at a higher rate of speed than the delivering means, the feeding means measuring off uniform lengths of said product, and means to intermittently stop the feeding means to hold a length of product at the latter relatively stationary for actuating the weighing means, there being a slack alternately produced and taken up between the delivering and the feeding means.

11. A device for indicating a variation in the weight of a continuous product including weighing means, and means to feed the product over the weighing means and to intermittently hold integral sections of constant size of the product successively stationary with respect to the weighing means for the weighing operation, indicator means operated by the weighing means, and means for operating the indicator means at a predetermined time interval only after the product has contacted the weighing means.

12. A device for indicating the weight variations of a continuous product continuously obtained, including a weighing means, means to bring the product as obtained into responsive coaction with the weighing means, including an operating means having spaced portions for moving the product relative to the weighing means and for obtaining successive integral sections of equal size of the product, the spaced portions successively carrying each section so that the length of the section is greater than the distance between said portions for freely actuating the weighing means, the operating means including means for causing the spaced portions to intermittently stop so that the sections are stationary during the weighing.

13. In combination, a machine having a delivering means for continuously delivering a continuous product, a weighing means, means for causing the product to be intermittently weighed as delivered, including means for moving the product over the weighing means, and means for causing the means for moving the product to intermittently stop, the means for moving the product having a normally higher speed than the delivering means.

In testimony whereof I affix my signature.
CHARLES C. KENYON.